US012611742B2

(12) United States Patent
Gröbner

(10) Patent No.: US 12,611,742 B2
(45) Date of Patent: Apr. 28, 2026

(54) FASTENING ARRANGEMENT FOR A PROCESSING MACHINE

(71) Applicant: Gröbner Fertigungs GmbH, Waging am See (DE)

(72) Inventor: Andreas Gröbner, Waging am See (DE)

(73) Assignee: Gröbner Fertigungs GmbH, Petting (DE)

( * ) Notice: Subject to any disclaimer, the term of this patent is extended or adjusted under 35 U.S.C. 154(b) by 376 days.

(21) Appl. No.: 18/181,216

(22) Filed: Mar. 9, 2023

(65) Prior Publication Data

US 2023/0286088 A1 Sep. 14, 2023

(30) Foreign Application Priority Data

Mar. 10, 2022 (DE) ..................... 10 2022 105 715.1

(51) Int. Cl.
| | |
|---|---|
| *B23Q 3/00* | (2006.01) |
| *B23Q 1/00* | (2006.01) |
| B23Q 3/06 | (2006.01) |

(52) U.S. Cl.
CPC .............. *B23Q 1/0072* (2013.01); *B23Q 3/06* (2013.01)

(58) Field of Classification Search
CPC ................................ B23Q 3/06; B23Q 1/0072
See application file for complete search history.

(56) References Cited

U.S. PATENT DOCUMENTS

| | | | | |
|---|---|---|---|---|
| 3,598,391 | A * | 8/1971 | Butler ...................... | B23Q 3/08 269/25 |
| 2004/0026843 | A1* | 2/2004 | Roth .................... | B23Q 1/0072 269/309 |
| 2020/0384589 | A1* | 12/2020 | Chuang ............... | B23B 31/1071 |
| 2022/0168821 | A1* | 6/2022 | Seo ...................... | B23Q 1/0072 |
| 2023/0286088 | A1* | 9/2023 | Andreas Groebner ...................... B23Q 1/0072 |

* cited by examiner

*Primary Examiner* — Lee D Wilson
(74) *Attorney, Agent, or Firm* — Mark L. Maki; Ingenuity Squared PLC

(57) ABSTRACT

A constraining assembly for a processing machine (1) is proposed that has a plate-shaped base (2) with at least one receiving hole (3) and at least one constraining bolt (4) for directly or indirectly constraining workpieces that are to be processed, wherein the constraining bolt (4) is placed in the receiving hole (3) in the base such that it can be removed therefrom, and wherein the base (2) has a receiving space (5) in which there is at least one actuating element (6) that can move axially, with which numerous lever elements (7) can be actuated to axially move the constraining bolt (4) in the receiving hole (3) in order to clamp and secure, or release, the constraining bolt (4). A constraining bolt (4) for a constraining assembly, as well as a processing machine (1) with such a constraining assembly, and a method for operating the constraining assembly, are also proposed.

19 Claims, 7 Drawing Sheets

FASTENING ARRANGEMENT FOR A PROCESSING MACHINE

The present invention relates to a constraining assembly or fastening arrangement for a processing machine that has a plate-shaped base with at least one receiving hole and at least one constraining bolt for directly or indirectly constraining workpieces, in which the bolt is placed in the receiving hole in the base. The invention also relates to a bolt for a constraining assembly and a processing machine with such a constraining assembly, and a method for using the constraining assembly.

A clamp for processing machines is disclosed in DE 10 2005 033 468 A1. The clamp comprises a base in which a retaining element is removably placed. The retaining element supports a workpiece holder on which the workpiece that is to be processed is placed. The base has a cup-shaped receiver in which the retaining element is placed. The retaining element is rotationally symmetrical along its longitudinal axis. When the retaining element is placed in the receiver, it is encompassed by a clamp in the base, lying in the middle thereof. The clamp is formed by curved walls made of a flexible material. A clamping element adjoins the inward-facing edges of the clamp, which is connected to the walls such that an inward deformation of the walls acts on the clamping element in a uniform direction, such that the clamping element is moved radially inward toward the retaining element, thus holding the retaining element in place in the receiver in the base.

It has proven to be the case that the retaining element must be placed correctly in the receiver in order for the retaining element to be held correctly in the known clamps, because otherwise, the clamping element cannot hold the retaining element securely. If, for example, foreign objects such as shavings get into the receiver, the retaining element will not be in the right position in the receiver for holding objects. Consequently, the retaining element cannot be held correctly in the receiver with the known clamps, such that the workpiece holder on the retaining element is not reliably held in the processing machine.

The fundamental object of the invention is to create a constraining assembly and a constraining bolt, as well as a processing machine or machine tool with such a constraining assembly, and a method for using the constraining assembly with which it is ensured that the workpiece is directly or indirectly held in place with the constraining bolt in the base of the constraining assembly in the structurally simplest manner.

This object is obtained according to the invention by the features of claims 1, 11, 13, and 14. Advantageous and other claimed developments of the invention can be derived from the respective dependent claims and the description, as well as the drawings.

As such, a constraining assembly or clamp assembly for a processing machine, machine tool, or the like is proposed, which has a plate-shaped base with at least one receiver, receiving hole, or the like, and at least one constraining bolt for directly or indirectly constraining workpieces that are to be processed, pallets for receiving the workpieces, workpiece holders, etc., in which each constraining bolt is placed in the receiving holes in the base such that it can be removed therefrom. In order to ensure that the constraining bolts are reliably secured in the base in a simple manner, the base has a receiving space in which there is at least one actuating element that can move in the axial direction, with which numerous lever elements can be operated such that they move in the axial direction in order to draw the constraining bolt inward into the receiving hole, in order to clamp and secure, or release, the constraining bolt.

An axial movement is obtained in this manner via a force that draws the constraining bolt inward into the proposed constraining assembly for clamping and securing or releasing the constraining bolt, such that the constraining bolt is drawn into the receiving hole and then clamped in place. This ensures that the constraining bolt is basically automatically moved into its secured position. Because lever elements are used to apply the axial movement of the actuating element to the constraining bolts, the force drawing the constraining bolt into the receiving hole can increase exponentially, for example.

In the framework of the invention, a first end of each lever element is dedicated to the actuating element, and a second end of each lever element is dedicated to the constraining bolt placed in the receiving hole. Force is therefore transferred from the actuating element to the constraining bolt through a pivoting of the lever elements in the constraining assembly, such that the constraining bolt is clamped and secured, or released, in a structurally simple and space-saving manner.

A particularly compact and thin design is obtained in that each lever element has a supporting segment dedicated to the actuating element where it is pivotally supported, and a first bracing segment, where it is braced against the base, and a second bracing segment that is braced against a cover element for the base, and a bearing segment facing the constraining bolt, such that the constraining bolt can be moved axially in the receiving hole in the base in order to clamp and secure it in place, or release it. In this manner, the segments of the lever elements necessary for pivotally supporting, bracing and also securing and releasing, are obtained with the lever elements in a particularly space-saving manner.

Furthermore, the framework of the present invention provides that the supporting segments are at the first end of each lever element, and the first and second bracing segments as well as the bearing segments are at the second end of each lever element, such that the first bracing segments bear on the base and the second bracing segments bear on the cover element, while the bearing segments bear on the corresponding bearing surfaces on the constraining bolts. The supporting segments at the first ends of the lever elements therefore form the pivotal support on the actuating element, and the second ends are braced against the cover element and the base forming a housing, and also bear on the constraining bolts to enable axial movement thereof. This basically results in one-armed lever elements in the proposed constraining assembly.

In order to adjust the forces with which the constraining bolts are drawn in or clamped, or alter the axial movement thereof, the bearing segments of each lever element bear on bearing surfaces on the constraining bolts that are at a specific angle in relation to the longitudinal axis of the constraining bolt. The axial distance travelled by the constraining bolt when securing or releasing it depends on the angle of the bearing surface that has been selected according to the invention. A bearing surface at a smaller angle results in a greater axial distance travelled by the constraining bolt. The angle of the bearing surface on the constraining bolt can therefore be selected in order to alter the force with which the bolt is drawn in, and thus alter the distance travelled by the constraining bolt when it is being clamped and secured or released.

To make optimal use of the receiving space in the base, the receiving space in the base can encompass the central receiving hole with a substantially circular shape in the framework of the present invention, and the actuating element can encircle the circular receiving space. The actuating element therefore basically forms a piston element that can move axially in the cylindrical receiving space, and the rod- or bar-shaped constraining bolt is received in the central receiving hole such that it can move axially therein.

In order to delimit the axial movement of the actuating element at the bottom in the receiving space in the base, the bottom of the receiving space has a cover element attached to the base. This cover element therefore basically acts as a lower stop and the receiving space in the base acts as an upper stop for the piston-like actuating element.

In order for the lever elements to pivot when the actuating element is moved axially, the circular actuating element has numerous receivers distributed over the internal circumference for the supporting segments of the lever elements.

The circular actuating element has numerous receivers on its outer circumference for spring elements, e.g. in the form of helical springs, that exert a pretension on the actuating element, wherein each of the spring elements is braced at a first end in a receiver on the actuating element, and at the second end against the cover element.

Instead of springs, other elastic elements or other actuating means can be used to exert a pretension on the actuating element to hold it in place.

The fundamental object of the invention is also achieved with the constraining bolt described above. This constraining bolt is therefore claimed separately from the constraining assembly. The constraining bolt is intended to be used in or with the constraining assembly.

The constraining bolt has a bearing surface forming a step encircling it, which is at a specific angle to the longitudinal axis of the constraining bolt, to which a force is applied that acts on the constraining bolt in order to draw it inward in the axial direction. An actuating, or clamping, force is therefore applied to this circular bearing surface on the constraining bolt, such that it can be clamped and secured in place, or released. The force that draws the bolt in as well as the path travelled by the constraining bolt in order to secure and release it can be adjusted by altering the predetermined angle.

The axial distance travelled by the constraining bolt depends on the angle of the bearing surface in the framework of the invention, such that when the angle of the bearing surface is smaller, or more pointed, the axial distance that the constraining bolt travels in the receiving hole is greater. Consequently, if the axial distance travelled by the constraining bolt is greater, the constraining force is weaker, and vice versa.

Lastly, the fundamental object of the invention is also achieved with a method for operating the constraining assembly described above. In this separately claimed method, the constraining bolt in the constraining assembly is held securely in place via a bearing surface and lever elements bearing thereon in a receiving space in a base. In order to move the constraining bolt axially when it is not clamped in place, a pressurized medium is introduced into the receiving space such that an actuating element is moved axially against a pretensioning, resulting in a pivoting of the lever elements, thus releasing the constraining bolt. The released constraining bolt is secured in place again after the medium has been removed due to the axial movement resulting from the pretensioning.

The axial movement of the constraining bolt into or out of the receiving hole results in a reliable securing as well as releasing of the bolt with the method proposed according to the invention.

The present invention shall be explained in greater detail below in reference to the drawings.

Therein:

Figure 1:
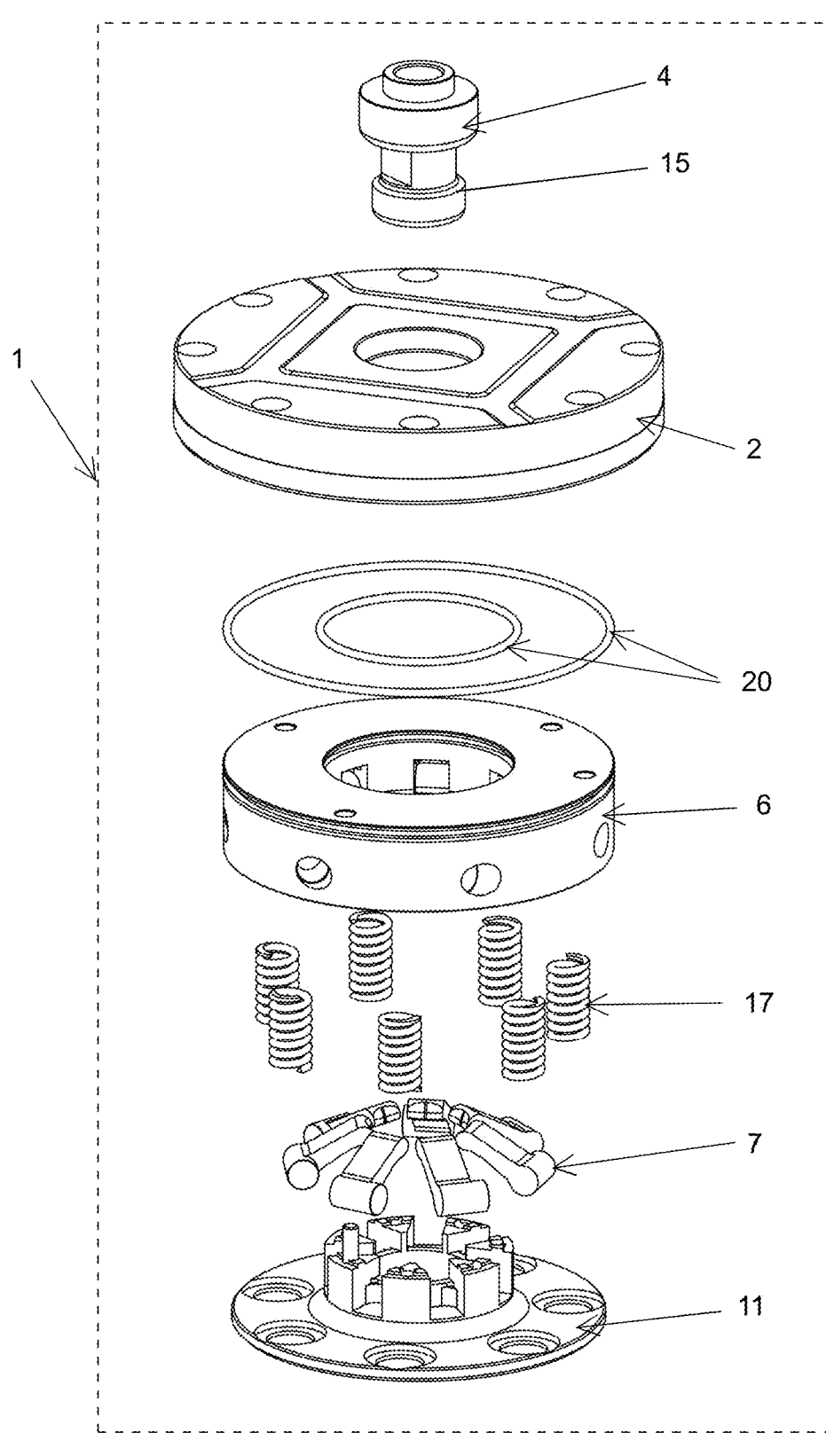
FIG. 1 shows an exploded view of one possible embodiment of a constraining assembly for a processing machine according to the invention.

Various illustrations of the constraining assembly for a processing machine are shown, merely by way of example, in FIGS. 1 to 15. The constraining assembly is attached to a processing machine 1, which is only indicated schematically. The processing machine, or machine tool 1, can be a lathe, milling machine, 3D printer, or robot, by way of example.

The constraining assembly has a plate-shaped circular base 2, with at least one receiving hole 3 and at least one bolt 4 for directly or indirectly constraining workpieces that are to be processed. The workpieces can be secured directly with the constraining bolt 4, or indirectly, for example, via a pallet support, a tool clamp, etc. on the constraining bolt 4.

The constraining bolt 4 is placed in the receiving hole 3 in the base 2 such that it can be removed therefrom. In order to secure the bolt 4 reliably and in a structurally simple manner, the base 2 has a receiving space 5 in which there is an actuating element 6 than can move axially, with which numerous lever elements 7 can be actuated to move the constraining bolt axially in the receiving space 5 in order to clamp and secure, or release, the constraining bolt 4.

Figure 2:
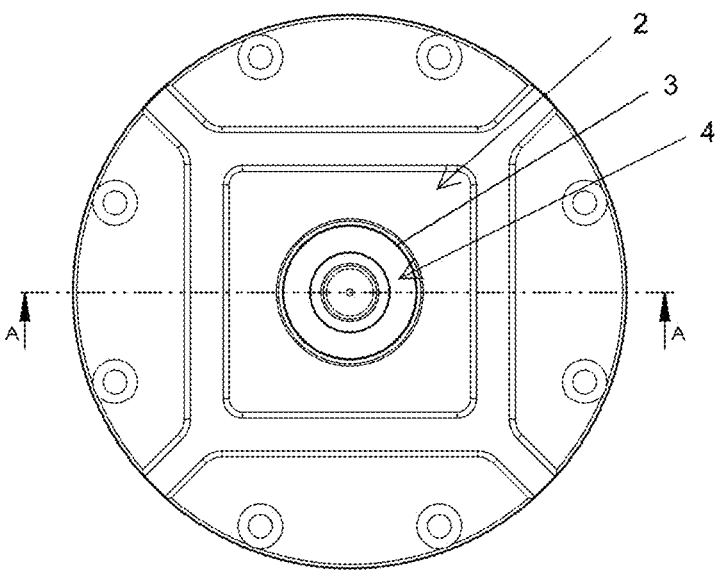
FIG. 2 shows a view from above of a base for the constraining assembly.

FIG. 1 shows an exploded view of the various parts of the constraining assembly, illustrating the various components of the constraining assembly, while FIG. 2 shows the base 4 of the constraining assembly from above.

Figure 3:
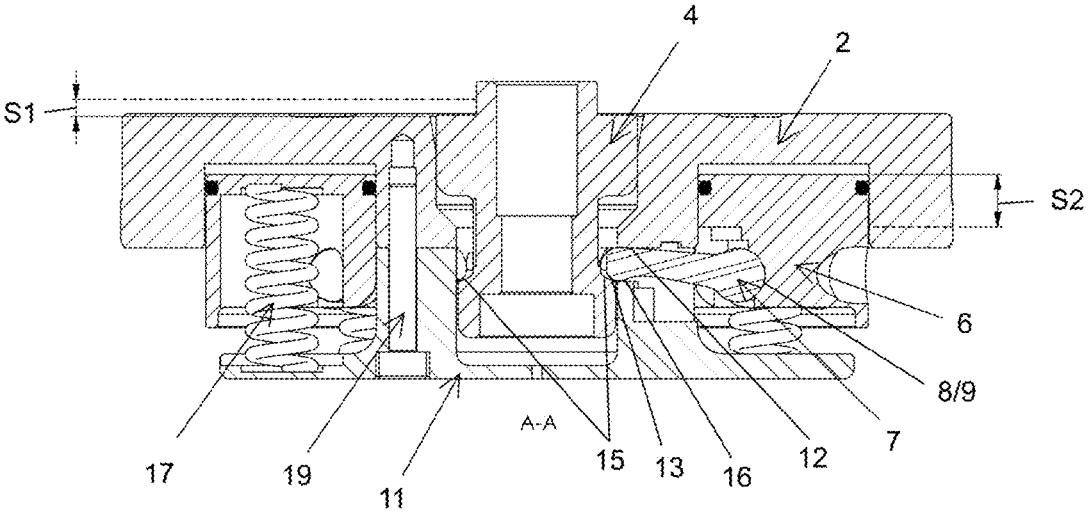
FIG. 3 shows a cutaway view illustrating the constraining assembly in the secured state, cut along the line A-A shown in FIG. 2.

FIG. 3 shows a cutaway view of the constraining assembly in the clamping, or secured state, cut along the line A-A in FIG. 2, in which the constraining bolt 4 is secured in the receiving hole 3 in the base 2 by the lever elements 7. Because a first end of the lever 7 is functionally connected to the actuating element 6 and a second end of each lever 7 acts on the constraining bolt 4 in the receiving hole 3, the constraining bolt 4 is held in place by the lever elements 7 via the actuating element 6 that is pretensioned by the helical spring elements 17, and secured in the receiving hole 3 in the base 2 of the constraining assembly.

The axial distance S2 travelled by the actuating element 6 in the receiving space 5 in the base 2 necessary for securing the bolt 4 is also indicated by way of example in FIG. 3. The axial distance S1 travelled by the constraining bolt 4 in the receiving hole 3 in the base 2 as a result of the axial distance S2 travelled by the actuating element 6 when the lever elements 7 clamp and secure the bolt in place is also indicated in FIG. 3 by way of example.

Figure 4:
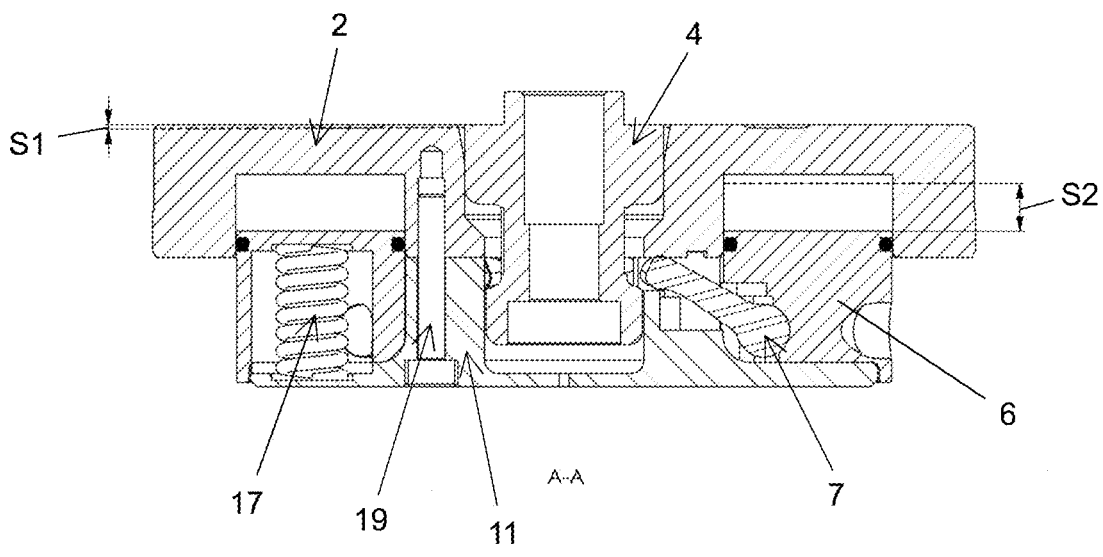
FIG. 4 shows a cutaway view illustrating the constraining assembly in the released state, cut along the line A-A shown in FIG. 2.

FIG. 4 shows a cutaway view cut through the constraining assembly along the line A-A in FIG. 2 when the constraining bolt 4 is not secured in place. A pressurized medium, e.g. pressurized air, is introduced into the receiving space 5 in the base 4 in order to move the constraining bolt 4 axially when it is not clamped or secured in place, such that the actuating element 6 is moved axially against the tension of the helical spring elements 17, thus pivoting the lever elements 7 and releasing the constraining bolt 4, such that the constraining bolt 4 can be removed from the receiving hole 3. After removing the pressurized air, the released constraining bolt 4 is basically automatically secured back in place by the tensioning forces generated by the helical spring elements 17.

The axial distance S2 travelled by the actuating element 6 in the receiving space 5 in the base 2 necessary for releasing the constraining bolt 4 is also indicated by way of example in FIG. 4. The axial distance S1 travelled by the constraining bolt 4 in the receiving space 3 in the base 2 as a result of the axial distance S2 travelled by the actuating element 6 when the lever elements 7 release the bolt is also indicated by way of example in FIG. 4.

Figure 5:
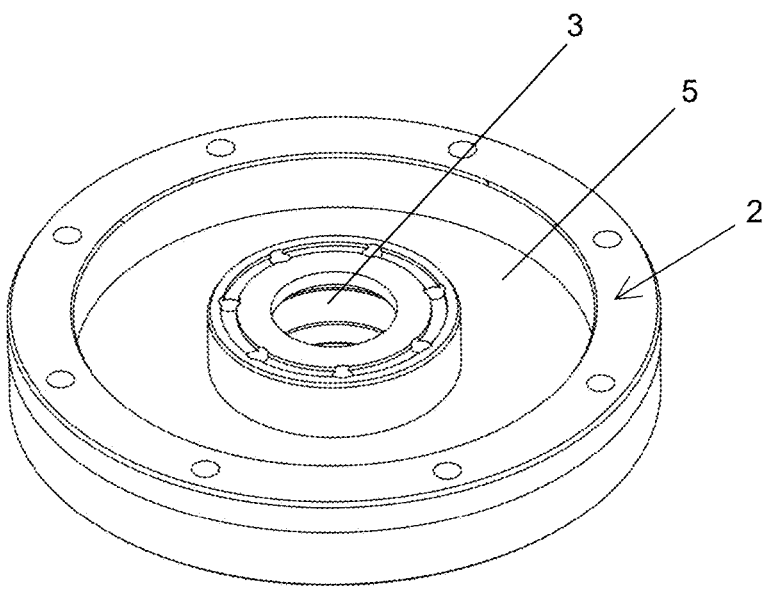
FIG. 5 shows a three dimensional view illustrating the parts of a receiving space in the base, from below.

FIG. 5 shows the individual parts of the base 2 from below, looking into the receiving space 5. The receiving space 5 in the base 2 is substantially circular, surrounding the central receiving hole 3. The actuating element 6 (not shown) can move axially in the circular receiving space 5.

Figure 6:
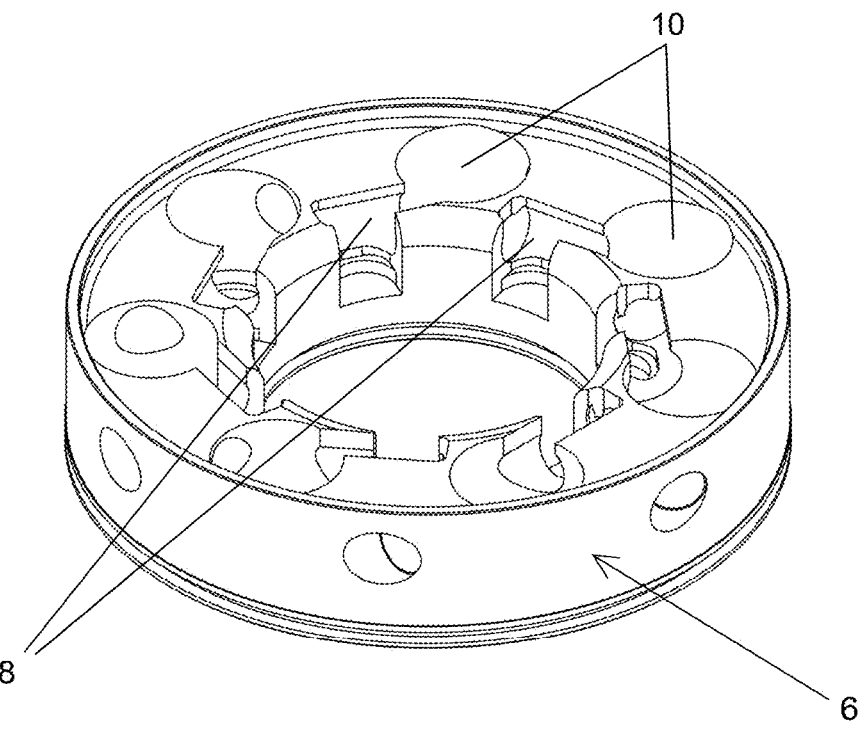
FIG. 6 shows a three dimensional view illustrating the parts of an actuating element for operating lever elements for securing or releasing a constraining bolt, from below.

The view illustrating the individual parts of the actuating element 6 shown in FIG. 6 shows that the actuating element 6 has a circular shape that fits into the circular receiving space 5. The circular or piston-shaped actuating element 6 that can move axially has numerous receivers 8 distributed over the internal circumference for the supporting segments 9 of the lever elements 7. The circular actuating element 6 also has numerous receivers 10 distributed over its outer circumference for the spring elements 17 that generate the pretension, each of which are braced at a first end in the receiver 10 on the actuating element 6 and at a second end on a receiver 18 in a cover element 11.

Figure 7:
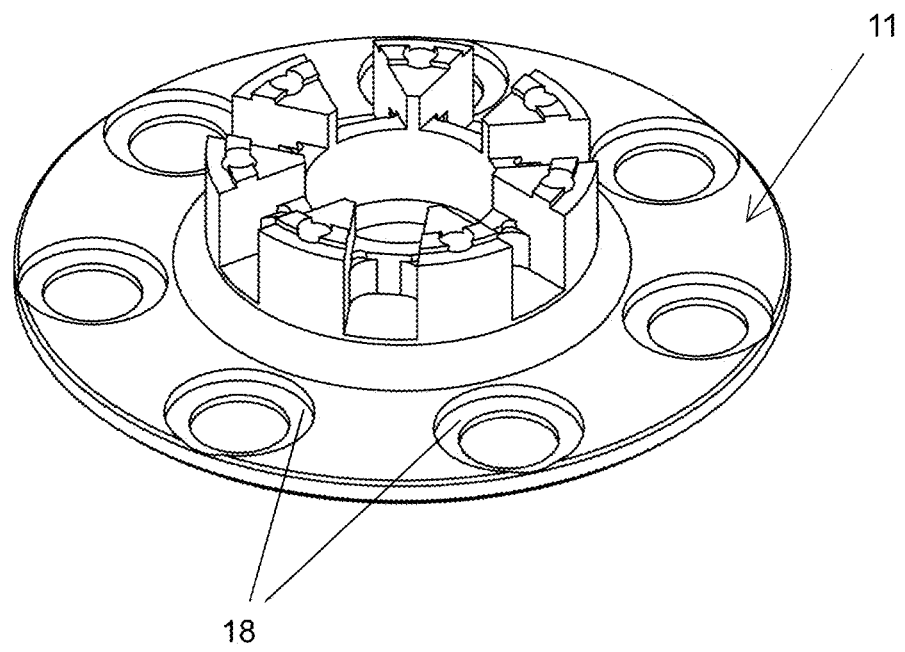
FIG. 7 shows a three dimensional view illustrating the parts of a cover element for delimiting the receiving space in the base.

The individual parts of the cover element 11 are illustrated in FIG. 7, and the cover element 11 is secured to the bottom of the base 2 with screws, thus delimiting the receiving space 5 in the base 2.

Figure 8:
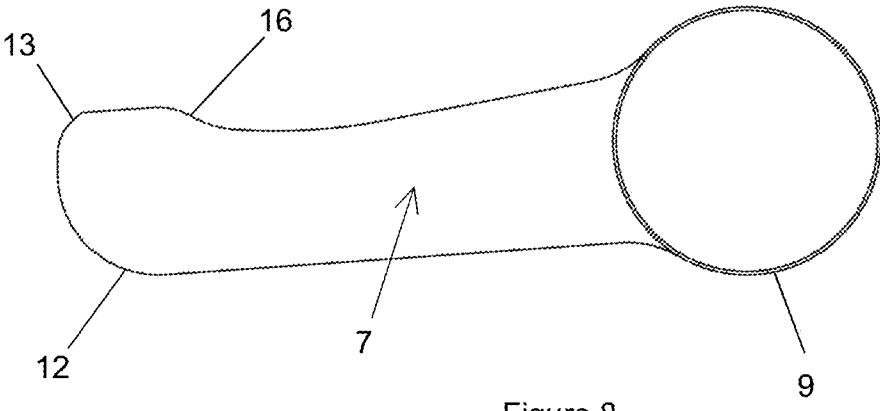
FIG. 8 shows a side view illustrating the parts of a lever element used in the constraining assembly.
Figure 9:
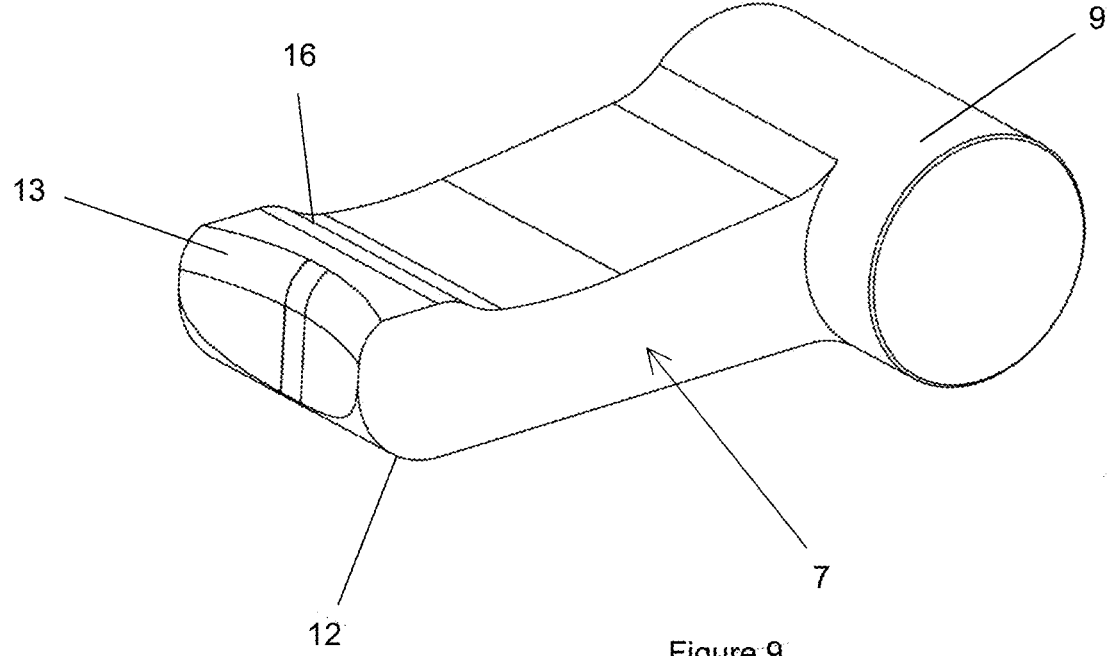
FIG. 9 shows a three dimensional view illustrating the parts of the lever element used in the constraining assembly.

The individual parts of the lever element 7 are shown in FIGS. 8 and 9. It can be derived therefrom that each lever element 7 has a supporting segment 9 dedicated to the actuating element 6 on which it pivots, and a first bracing segment 12 dedicated to the base, where it is braced against the base 2, and a second bracing segment 16 dedicated to the cover element 11, where it is braced against the cover element 11. Each lever element 7 also has a bearing segment 13 dedicated to the constraining bolt 4, with which the constraining bolt 4 is moved in the receiving space 3 in the base 2 in order to clamp and secure it in place, or release it. The supporting segment 9 is at the first end of the lever element 7, and the first bracing segment 12 and second bracing segment 16, as well as the bearing segment 13 are at the second end of the lever element 7. The first end of each lever element 7 is therefore dedicated to the actuating element 6, and the second end of each lever element is dedicated to the constraining bolt 4 in the receiving hole 3. In this manner, a movement of the actuating element 6 results in a pivoting of the lever elements 7, and therefore an axial movement of the constraining bolt 4 in order for it to be clamped and secured in place, or released.

Figure 10:
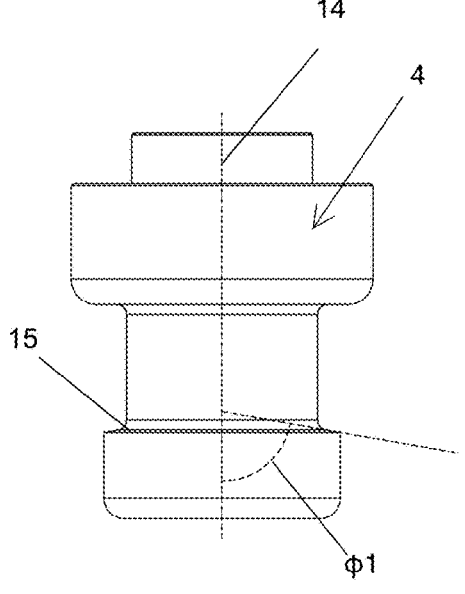
FIG. 10 shows a view illustrating the parts of a constraining bolt, in which a bearing surface is at a first, greater, blunt angle.
Figure 11:
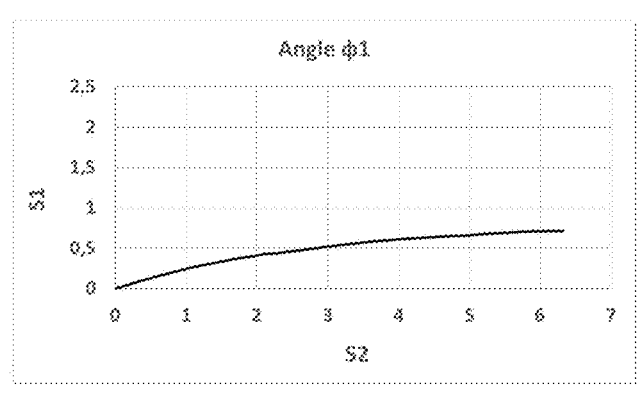
FIG. 11 shows a graph plotting an axial distance travelled by the constraining bolt in relation to an axial distance travelled by the actuating element with the first angle of the bearing surface.
Figure 12:
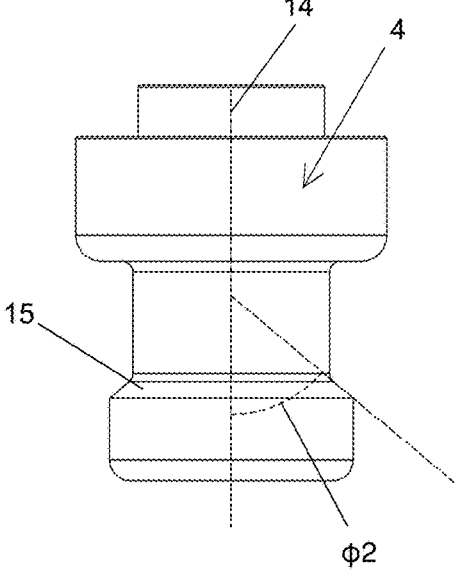
FIG. 12 shows a view illustrating the parts of the constraining bolt, in which the bearing surface is at a second, medium angle.
Figure 13:
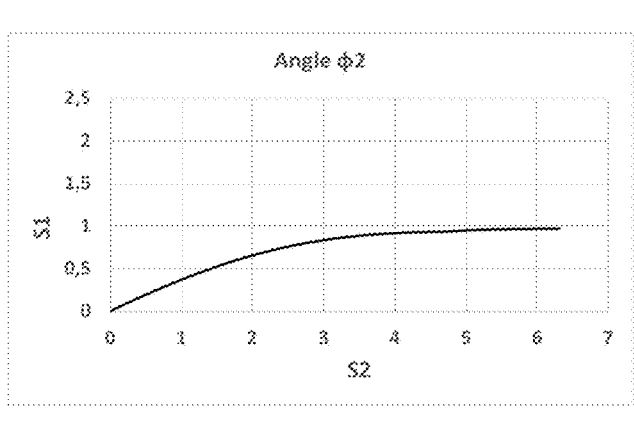
FIG. 13 shows a graph plotting the axial distance travelled by the constraining bolt in relation to an axial distance travelled by the actuating element with the second angle of the bearing surface.
Figure 14:
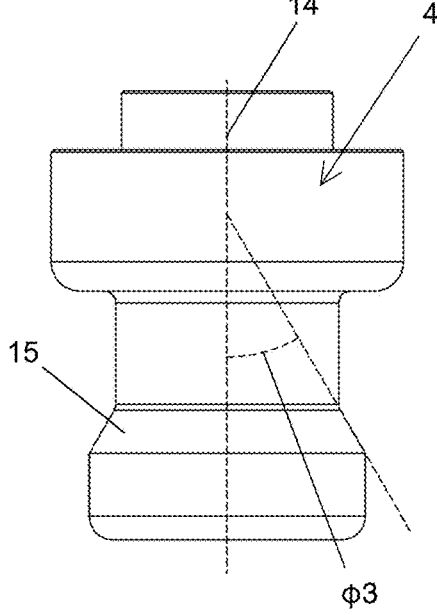
FIG. 14 shows a view illustrating the parts of the constraining bolt, in which the bearing surface is at a third, smaller, pointed angle.
Figure 15:
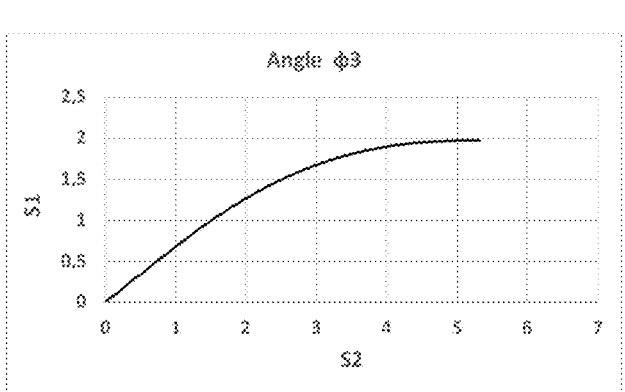
FIG. 15 shows a graph plotting the axial distance travelled by the constraining bolt in relation to an axial distance travelled by the actuating element with the third angle of the bearing surface.

The individual parts of the separately claimed constraining bolt 4 are shown in FIGS. 10, 12, and 14. It can be derived therefrom that the constraining bolt 4 has a circumferential bearing surface 15 forming a step encompassing the constraining bolt 4. The bearing surface 15 is at different angles $\phi 1$, $\phi 2$, $\phi 3$ to the longitudinal axis of the constraining bolt 4 in each of the FIGS. 10, 12, 14. The bearing segment 13 of each lever element 7 acts on the bearing surface 15 in a functional connection thereto. In the associated graphs shown in FIGS. 11, 13, 15, the axial distance S1 travelled by the constraining bolt 4 in the receiving space 3 resulting from the predetermined angle $\phi 1$, $\phi 2$, $\phi 3$ is plotted in relation to the axial distance S2 travelled by the actuating element 6 when clamping and securing the constraining bolt 4 in place.

In FIG. 10, the bearing surface 15 is at a greater and blunter angle $\phi 1$ to the longitudinal axis 14 of the constraining bolt 4. It can be seen from the associated graph shown in FIG. 11 that the distance S1 that is travelled is shorter. This results in a stronger force acting on the constraining bolt 4 by the spring elements 7 in order to secure it in place.

In FIG. 12, the bearing surface 15 is slanted at a medium angle $\phi 2$ in relation to the longitudinal axis 14 of the constraining bolt 4. It can be seen from the associated graph shone in FIG. 13 that the constraining bolt 4 travels a medium distance S1, which is greater than that travelled with the first, blunter angle $\phi 1$. This results in a weaker force acting on the constraining bolt 4 by the lever elements 7 to secure it in place than with the first angle $\phi 1$ of the bearing surface 15.

In FIG. 14, the bearing surface 15 is slanted at a smaller, more pointed angle $\phi 3$ in relation to the longitudinal axis 14 of the constraining bolt 4. It can be seen from the associated graph shown in FIG. 15 that this results in the greatest axial distance travelled by the constraining bolt 4 in relation to the first angle $\phi 1$ and the second angle $\phi 2$. This results in the weakest force acting on the constraining bolt 4 by the lever elements 7 to secure it in place in relation to the first angle $\phi 1$ and second angle $\phi 2$ of the bearing surface 15.

REFERENCE SYMBOLS 1 processing machine
2 base
3 receiving hole
4 constraining bolt
5 receiving space
6 actuating element
7 lever element
8 receiver in the actuating element for a lever element
9 supporting segment of the lever element
10 receiver in the actuating element for a spring element
11 cover element
12 first bracing segment of the lever element
13 bearing segment of the lever element
14 longitudinal axis of the constraining bolt
15 bearing surface on the constraining bolt
16 second bracing segment of the lever element
17 spring element
18 receivers in the cover element for spring elements
19 constraining screw
20 O-ring
φ1 first angle
φ2 second angle
φ3 third angle
S1 axial distance travelled by the constraining bolt between securing and releasing
S2 axial distance travelled by the actuating element between securing and releasing

The invention claimed is:

1. A constraining assembly for a processing machine that has a plate-shaped base with at least one receiving hole and at least one constraining bolt for directly or indirectly constraining workpieces that are to be processed, wherein the constraining bolt is placed in the receiving hole in the base such that the restraining bolt can be removed therefrom, comprising the improvement wherein the base has a receiving space in which there is at least one actuating element that can move axially, with which a plurality of lever elements are configured to axially move the constraining bolt in the receiving hole in order to clamp and secure, or release, the constraining bolt, and further comprising the improvement wherein each of the lever elements has a supporting segment dedicated to the actuating element where said lever element pivots on the actuating element, a first bracing segment dedicated to the base, and a second bracing segment dedicated to a cover element on the base, and a bearing segment facing the constraining bolt for moving the constraining bolt axially in the receiving hole in the base in order to clamp and secure the constraining bolt in place, or to release the constraining bolt.

2. The constraining assembly according to claim 1, wherein a first end of each lever element is dedicated to the actuating element and a second end of each of the lever elements is dedicated to the constraining bolt in the receiving hole.

3. The constraining assembly according to claim 1, wherein the supporting segment is on the first end of each lever element and the first bracing segment and the second bracing segment as well as the bearing segment are on the second ends of the lever elements, wherein the first bracing segment bears on the base and the second bracing segment bears on the cover element, and the bearing segment bears on a corresponding bearing surface on the constraining bolt.

4. The constraining assembly according to claim 1, wherein the bearing segment on each of the lever elements bears on the corresponding bearing surface on the constrain-ing bolt, which is at a predetermined angle relative to a longitudinal axis thereof, in order to move the constraining bolt axially in the receiving hole.

5. The constraining assembly according to claim 4, wherein the predetermined angle is defined by a selected angle, which is one of a plurality of angles lesser or greater than each other, and the axial distance travelled by the constraining bolt depends on the selected angle of the bearing surface, wherein a smaller angle for the selected angle of the bearing surface results in a greater distance travelled by the constraining bolt in comparison to a larger angle for the selected angle that defines a lesser distance travelled by the constraining bolt.

6. The constraining assembly according to claim 1, wherein the receiving space in the base encompassing the central receiving hole is substantially circular, and that the actuating element has a circular form that fits in the circular receiving space.

7. The constraining assembly according to claim 1, wherein the receiving space is delimited by a cover element attached to the base.

8. The constraining assembly according to claim 6, wherein the circular actuating element has a plurality of receivers for the supporting segments of the lever elements distributed over an inner circumference of the actuating element.

9. The constraining assembly according to claim 6, wherein the circular actuating element has a plurality of receivers for spring elements distributed over an outer circumference of the actuating element, wherein the spring elements are each braced at a first end thereof in the receivers in the actuating element and at a second end thereof in a respective cover element receiver on the cover element.

10. A constraining bolt for a constraining assembly for a processing machine that has a plate-shaped base with at least one receiving hole and at least one constraining bolt for directly or indirectly constraining workpieces that are to be processed, wherein the constraining bolt is placed in the receiving hole in the base such that the restraining bolt can be removed therefrom, wherein the base has a receiving space in which there is at least one actuating element that can move axially, with which a plurality of lever elements are configured to be actuated to axially move the constrain-ing bolt in the receiving hole in order to clamp and secure, or release, the constraining bolt, wherein the constraining bolt has a circumferential bearing surface forming a step encompassing the constraining bolt, which has a predeter-mined angle in relation to the longitudinal axis, at which a force is applied to the constraining bolt in order to draw the constraining bolt inward in the axial direction.

11. The constraining bolt according to claim 10, wherein the predetermined angle may be set at a selected angle, which is one of a plurality of angles lesser or greater than each other, and the axial distance travelled by the constrain-ing bolt is dependent on the selected angle of the bearing surface, wherein a smaller angle of the bearing surface results in a greater axial distance travelled by the constrain-ing bolt in comparison to a larger angle for the selected angle that defines a lesser distance travelled by the constraining bolt.

12. A processing machine that has at least one constrain-ing assembly having a plate-shaped base with at least one receiving hole and at least one constraining bolt for directly or indirectly constraining workpieces that are to be pro-cessed, wherein the constraining bolt is placed in the receiv-ing hole in the base such that the constraining bolt can be removed therefrom, comprising the improvement wherein the base has a receiving space in which there is at least one actuating element that can move axially, with which a plurality of lever elements are configured to be actuated to axially move the constraining bolt in the receiving hole in order to clamp and secure, or release, the constraining bolt, and wherein each of the lever elements has a supporting segment dedicated to the actuating element where said lever element pivots on the actuating element, a first bracing segment dedicated to the base, and a second bracing segment dedicated to a cover element on the base, and a bearing segment facing the constraining bolt for moving the constraining bolt axially in the receiving hole in the base in order to clamp and secure the constraining bolt in place, or to release the constraining bolt.

13. A method for operating a constraining assembly for a processing machine that has a plate-shaped base with at least one receiving hole and at least one constraining bolt for directly or indirectly constraining workpieces that are to be processed, wherein the constraining bolt is placed in the receiving hole in the base such that the restraining bolt can be removed therefrom, wherein the base has a receiving space in which there is at least one actuating element that can move axially, with which a plurality of lever elements are configured to be actuated to axially move the constraining bolt in the receiving hole in order to clamp and secure, or release, the constraining bolt, comprising the improvement wherein the method comprises the steps of the at least one actuating element being pretensioned to define a pretensioned actuating element, the constraining bolt in the constraining assembly being held in place by a bearing surface and a respective one of the lever elements bearing thereon in a receiving space in the base when clamped and secured in place, via the pretensioned actuating element, wherein in order to move the constraining bolt axially in a released state, a pressurized medium is introduced into the receiving space, such that the pretensioned actuating element is moved counter to the pretensioning, resulting in a pivoting of the respective one of the lever elements, and releasing the constraining bolt, and wherein after removing the medium, the released constraining bolt is again secured in place due to the pretensioning of the pretensioned actuating element acting thereon.

14. The constraining assembly according to claim 2, wherein each lever element has a supporting segment dedicated to the actuating element where the lever element pivots, a first bracing segment dedicated to the base, and a second bracing segment dedicated to a cover element on the base, and a bearing segment facing the constraining bolt for moving the constraining bolt axially in the receiving hole in the base in order to clamp and secure the constraining bolt in place, or to release the constraining bolt.

15. The constraining assembly according to claim 3, wherein the bearing segment on each lever element bears on the corresponding bearing surface on the constraining bolt, which is at a predetermined angle relative to the longitudinal axis thereof, in order to move the constraining bolt axially in the receiving hole.

16. The constraining assembly according to claim 7, wherein the circular actuating element has a plurality of receivers for the supporting segments of the lever elements distributed over an inner circumference thereof.

17. The constraining assembly according to claim 16, wherein the circular actuating element has a plurality of receivers for spring elements distributed over an outer circumference, thereof wherein the spring elements are each braced at a first end in the receivers in the actuating element and at a second end in a receiver on the cover element.

18. The constraining assembly according to claim 7, wherein the circular actuating element has a plurality of receivers for spring elements distributed over an outer circumference thereof, wherein the spring elements are each braced at a first end in the receivers in the actuating element and at a second end in a receiver on the cover element.

19. The constraining assembly according to claim 8, wherein the circular actuating element has a plurality of receivers for spring elements distributed over an outer circumference thereof, wherein the spring elements are each braced at a first end in the receivers in the actuating element and at a second end in a receiver on the cover element .

* * * * *